US008646650B2

(12) United States Patent
Lockwood et al.

(10) Patent No.: US 8,646,650 B2
(45) Date of Patent: Feb. 11, 2014

(54) PRODUCT DISPENSING SYSTEM

(75) Inventors: Thomas A. Lockwood, Clemmons, NC (US); Roger K. Miller, East Bend, NC (US)

(73) Assignee: Rock-Tenn Shared Services, LLC, Norcross, GA (US)

( * ) Notice: Subject to any disclaimer, the term of this patent is extended or adjusted under 35 U.S.C. 154(b) by 441 days.

(21) Appl. No.: 13/015,793

(22) Filed: Jan. 28, 2011

(65) Prior Publication Data

US 2011/0284571 A1 Nov. 24, 2011

Related U.S. Application Data

(63) Continuation-in-part of application No. 12/792,252, filed on Jun. 2, 2010, now Pat. No. 8,353,425.

(60) Provisional application No. 61/346,211, filed on May 19, 2010.

(51) Int. Cl.

| | |
|---|---|
| ***B65G 59/00*** | (2006.01) |
| ***B65H 3/00*** | (2006.01) |
| ***G07F 11/16*** | (2006.01) |
| ***B65H 1/08*** | (2006.01) |

(52) U.S. Cl.

USPC ........... 221/151; 221/279; 221/155; 221/174; 221/3; 221/15; 221/152; 221/227; 221/57; 700/240; 700/236; 211/59.3; 211/1.51

(58) Field of Classification Search

CPC ............ B65G 59/00; B65H 3/00; B65H 1/08; G07F 11/16

USPC ............... 221/155, 279, 151, 174, 3, 15, 152, 221/227, 57; 700/240, 236; 211/59.3, 1.51

See application file for complete search history.

(56) References Cited

U.S. PATENT DOCUMENTS

| | | | |
|---|---|---|---|
| 691,990 | A | 1/1902 | Warren |
| 1,034,318 | A | 7/1912 | Sobretto et al. |

(Continued)

FOREIGN PATENT DOCUMENTS

| | | |
|---|---|---|
| DE | 202005019621 | 3/2005 |
| DE | 202005010088 | 10/2005 |

(Continued)

OTHER PUBLICATIONS

Annex to Form PCTIISAI206—Communication Relating to the Results of the Partial International Search dated Aug. 20, 2010 in related Application No. PCT/US2010/037026.

(Continued)

*Primary Examiner* — Gene O. Crawford
*Assistant Examiner* — Rakesh Kumar
(74) *Attorney, Agent, or Firm* — Kilpatrick Townsend & Stockton LLP

(57) ABSTRACT

Dispensing systems and methods are disclosed that provide controlled advancement of product and provide controlled access to product stored within the system. Embodiments include a product pushing device having a track and a pusher that urges product stored on the track forward. Certain embodiments include mechanisms to limit the forward progression of the pusher along the track, such as a brake mechanism, and certain embodiments include mechanisms to block access to product located on the track. Some embodiments include mechanisms for providing a time delay in between the vending of products.

23 Claims, 12 Drawing Sheets

(56) References Cited

U.S. PATENT DOCUMENTS 1,123,071 A 12/1914 Bell
1,319,084 A 10/1919 Hurne
1,446,010 A 2/1923 Holland
1,533,147 A 4/1925 Svendsgaard
1,592,720 A 7/1926 Butler
1,614,363 A * 1/1927 Hicks ............................ 221/131
1,680,275 A 8/1928 Albaugh
1,755,655 A 4/1930 Langenfeld
1,813,935 A 7/1931 Knee
1,841,926 A * 1/1932 Zuehl .............................. 221/75
1,913,843 A 6/1933 Marcuse
2,142,053 A 12/1938 Hoban
2,163,280 A 6/1939 Hibshman
2,304,533 A 12/1942 Bright
2,317,145 A 4/1943 Hagstrom et al.
2,412,368 A 2/1945 Tascher
2,423,265 A 7/1947 Stewart
2,824,666 A 2/1958 Hausladen
2,977,023 A 3/1961 Meyer
3,161,295 A 12/1964 Chesley
3,199,724 A 8/1965 Domenico et al.
3,313,448 A 4/1967 Suttle et al.
3,351,233 A 11/1967 Chanoch et al.
3,452,899 A 7/1969 Libberton
3,578,207 A 5/1971 Danow
3,583,568 A 6/1971 Crossien
3,591,048 A 7/1971 Myers et al.
3,749,279 A 7/1973 Ungerman
3,752,357 A 8/1973 Harris
3,773,461 A 11/1973 Arimoto et al.
3,776,418 A 12/1973 Bookout
3,777,931 A 12/1973 Fleming
3,796,345 A 3/1974 Fessler
3,805,962 A 4/1974 Bendiksen
3,885,706 A 5/1975 Lodge
3,923,159 A 12/1975 Taylor et al.
3,957,173 A 5/1976 Roudebush
3,968,900 A 7/1976 Stambuk
3,999,662 A 12/1976 Barnhardt
4,007,853 A 2/1977 Bahneman
4,010,869 A 3/1977 Adamo
4,018,100 A 4/1977 Moe
4,190,179 A 2/1980 Moss et al.
4,228,903 A 10/1980 Eckert
4,275,819 A 6/1981 Perez
4,308,974 A 1/1982 Jones
4,336,892 A 6/1982 Cox et al.
4,369,887 A 1/1983 Emery
4,371,093 A 2/1983 Berger
4,412,607 A 11/1983 Collins et al.
4,474,300 A 10/1984 Entis
4,506,607 A 3/1985 Jacoby
4,576,272 A 3/1986 Morgan et al.
4,679,684 A 7/1987 Glaser
4,682,826 A 7/1987 Mestdagh
4,779,760 A 10/1988 Wittern et al.
4,852,767 A 8/1989 Humphrey
4,887,737 A 12/1989 Adenau
4,954,760 A 9/1990 Futch et al.
4,962,867 A 10/1990 Ficken et al.
4,965,551 A 10/1990 Box
5,012,936 A 5/1991 Crum
5,046,641 A 9/1991 Gray
5,067,634 A 11/1991 Vidondo
5,096,367 A 3/1992 Winski
5,097,611 A 3/1992 Smollar et al.
5,111,942 A 5/1992 Bernardin
5,121,854 A 6/1992 Trouteaud et al.
5,150,101 A 9/1992 Goris et al.
5,169,027 A 12/1992 Falk et al.
5,178,298 A 1/1993 Allina
5,199,598 A 4/1993 Sampson
5,229,749 A 7/1993 Yenglin
5,232,102 A 8/1993 Ozawa
5,240,126 A 8/1993 Foster et al.
5,248,060 A 9/1993 Friedman et al.
5,249,705 A 10/1993 Gates
5,252,948 A 10/1993 Goris et al.
5,253,782 A 10/1993 Gates et al.
5,263,596 A 11/1993 Williams
5,269,597 A 12/1993 Yenglin et al.
5,285,926 A 2/1994 Falk et al.
5,335,816 A 8/1994 Kaufman et al.
5,335,818 A 8/1994 Maldanis
5,360,134 A 11/1994 Falk
5,375,735 A 12/1994 Huvey et al.
5,375,737 A 12/1994 Ficken
5,385,266 A 1/1995 Pate
5,397,025 A 3/1995 Lee
5,400,919 A 3/1995 Gomm et al.
5,439,136 A 8/1995 Chatani et al.
5,450,969 A 9/1995 Johnson et al.
5,460,294 A 10/1995 Williams
5,462,198 A 10/1995 Schwimmer
5,542,552 A 8/1996 Yablans et al.
5,632,408 A 5/1997 Mitchell
5,665,304 A 9/1997 Heinen et al.
5,709,315 A 1/1998 Kahler et al.
5,716,114 A 2/1998 Holmes et al.
5,790,409 A 8/1998 Fedor et al.
5,813,568 A 9/1998 Lowing
5,855,281 A 1/1999 Rabas
5,909,932 A 6/1999 Shih
5,927,540 A 7/1999 Godlewski
5,960,984 A 10/1999 Weston
5,960,988 A 10/1999 Freixas
6,084,511 A 7/2000 Kil
6,105,791 A * 8/2000 Chalson et al. .............. 211/59.3
6,131,748 A 10/2000 Kawasaki et al.
6,176,558 B1 1/2001 Hilade et al.
6,189,727 B1 2/2001 Shoenfeld
6,196,416 B1 3/2001 Seagle
6,199,720 B1 3/2001 Rudick et al.
6,206,237 B1 3/2001 Dillon et al.
6,230,932 B1 5/2001 Lowing et al.
6,241,121 B1 6/2001 Yasaka
6,263,259 B1 7/2001 Bartur
6,301,501 B1 10/2001 Cronin et al.
6,318,591 B1 11/2001 Martin
6,325,242 B1 12/2001 Izawa et al.
6,415,953 B1 7/2002 O'Brien et al.
6,454,107 B1 9/2002 Belanger et al.
6,464,089 B1 10/2002 Rankin
6,474,478 B1 11/2002 Huchner et al.
6,478,187 B2 11/2002 Simson et al.
6,520,604 B1 2/2003 Yasaka et al.
6,581,798 B2 6/2003 Liff et al.
6,601,416 B1 8/2003 Sanders
6,604,652 B1 8/2003 Trautwein
6,622,979 B2 9/2003 Valiulis
6,659,291 B2 12/2003 Huchner et al.
6,684,126 B2 1/2004 Omura et al.
6,691,891 B2 * 2/2004 Maldonado .................. 221/279
6,694,221 B2 2/2004 Chavez et al.
6,735,473 B2 5/2004 Kolder et al.
D491,403 S 6/2004 Gervasi
6,758,370 B2 7/2004 Cooke et al.
6,776,304 B2 8/2004 Liff et al.
6,786,341 B2 9/2004 Stinnett et al.
6,814,254 B2 11/2004 Liff et al.
6,814,255 B2 11/2004 Liff et al.
6,857,539 B2 2/2005 Parra
6,892,898 B1 5/2005 Boone et al.
6,957,555 B1 10/2005 Nagel et al.
7,007,810 B2 3/2006 Huehner et al.
7,017,778 B2 3/2006 Halbherr
7,024,894 B2 4/2006 Salone
7,032,776 B2 4/2006 Hieb
D521,363 S 5/2006 Copen et al.
7,052,097 B2 5/2006 Meek et al.
7,086,541 B2 8/2006 Robertson
7,128,221 B2 10/2006 Metcalf
7,128,239 B2 10/2006 Skavnak
7,131,542 B2 11/2006 Sedon et al.

(56) References Cited

U.S. PATENT DOCUMENTS

| | | | | |
|---|---|---|---|---|
| 7,149,600 | B2 | 12/2006 | Rippolone | |
| 7,150,365 | B2 | 12/2006 | Hardy et al. | |
| 7,151,982 | B2 | 12/2006 | Liff et al. | |
| 7,152,536 | B2 | 12/2006 | Hardy | |
| 7,175,045 | B2 | 2/2007 | Bond | |
| 7,178,678 | B2 | 2/2007 | Mansfield et al. | |
| 7,197,902 | B1 | 4/2007 | Barkdoll | |
| 7,207,447 | B2 | 4/2007 | Medcalf et al. | |
| 7,213,722 | B2 | 5/2007 | Nagelski et al. | |
| 7,246,711 | B1 | 7/2007 | Metcalf | |
| 7,249,761 | B2 | 7/2007 | Graef et al. | |
| 7,264,138 | B2 | 9/2007 | Collins et al. | |
| 7,269,983 | B1 | 9/2007 | Mchatet | |
| 7,293,672 | B2 | 11/2007 | Mori et al. | |
| 7,299,934 | B2 | 11/2007 | Hardy et al. | |
| 7,303,095 | B2 | 12/2007 | Nagelski | |
| 7,347,335 | B2 * | 3/2008 | Rankin et al. | 211/59.3 |
| 7,348,884 | B2 | 3/2008 | Higham | |
| 7,389,886 | B2 | 6/2008 | Hardy et al. | |
| 7,451,881 | B2 | 11/2008 | Hardy et al. | |
| 7,458,473 | B1 * | 12/2008 | Mason | 211/59.3 |
| 7,469,791 | B2 | 12/2008 | Phoy | |
| 7,497,341 | B2 | 3/2009 | Hardy et al. | |
| 7,533,784 | B2 | 5/2009 | Vlastakis et al. | |
| 7,564,351 | B2 | 7/2009 | Nagelski et al. | |
| 7,604,145 | B2 | 10/2009 | Percy | |
| 7,621,409 | B2 | 11/2009 | Hardy et al. | |
| 7,641,072 | B1 | 1/2010 | Vlastakis et al. | |
| 7,661,545 | B2 | 2/2010 | Hardy et al. | |
| 7,669,722 | B2 | 3/2010 | Hardy et al. | |
| 7,675,421 | B2 | 3/2010 | Higham | |
| 7,768,399 | B2 | 8/2010 | Hachmann et al. | |
| 7,784,644 | B2 | 8/2010 | Albert et al. | |
| 7,823,734 | B2 | 11/2010 | Hardy | |
| 7,828,158 | B2 | 11/2010 | Colelli et al. | |
| 7,837,058 | B2 | 11/2010 | Collins et al. | |
| 8,013,740 | B2 | 9/2011 | Irmscher et al. | |
| 8,038,016 | B2 | 10/2011 | Yuama et al. | |
| 8,047,385 | B2 * | 11/2011 | Hardy | 211/59.3 |
| 8,056,734 | B2 | 11/2011 | Menz et al. | |
| 8,056,740 | B2 | 11/2011 | Weshler et al. | |
| 8,087,541 | B2 | 1/2012 | Valota et al. | |
| 8,090,473 | B2 | 1/2012 | Higham | |
| 8,146,471 | B2 | 4/2012 | Hansen et al. | |
| 8,146,753 | B2 | 4/2012 | Yuyama | |
| 8,190,289 | B2 | 5/2012 | Lockwood | |
| 8,215,520 | B2 * | 7/2012 | Miller et al. | 221/129 |
| 8,235,227 | B2 * | 8/2012 | Hardy | 211/59.3 |
| 8,353,425 | B2 * | 1/2013 | Lockwood et al. | 221/227 |
| 8,386,075 | B2 * | 2/2013 | Lockwood et al. | 700/236 |
| 2003/0029816 | A1 | 2/2003 | Huchner et al. | |
| 2003/0121929 | A1 | 7/2003 | Liff et al. | |
| 2003/0178435 | A1 | 9/2003 | Yamaguchi | |
| 2003/0189058 | A1 | 10/2003 | Liff et al. | |
| 2004/0026344 | A1 | 2/2004 | Sedon et al. | |
| 2004/0059464 | A1 | 3/2004 | Veenstra et al. | |
| 2004/0060944 | A1 | 4/2004 | Gervasi | |
| 2004/0084386 | A1 | 5/2004 | Huchner et al. | |
| 2004/0104239 | A1 | 6/2004 | Black et al. | |
| 2004/0149768 | A1 | 8/2004 | Scoville et al. | |
| 2004/0238557 | A1 | 12/2004 | Chirnomas | |
| 2005/0029205 | A1 | 2/2005 | Mansfield et al. | |
| 2005/0029283 | A1 | 2/2005 | Pedigo | |
| 2005/0065645 | A1 | 3/2005 | Liff et al. | |
| 2005/0189369 | A1 | 9/2005 | Vlastakis | |
| 2005/0189370 | A1 | 9/2005 | Carter et al. | |
| 2005/0199644 | A1 | 9/2005 | Barili et al. | |
| 2005/0205596 | A1 | 9/2005 | Kelly | |
| 2005/0252925 | A1 | 11/2005 | Kelly | |
| 2006/0138915 | A1 | 6/2006 | Goldberg | |
| 2006/0157431 | A1 | 7/2006 | Nagelski et al. | |
| 2006/0163272 | A1 | 7/2006 | Gamble | |
| 2006/0219730 | A1 | 10/2006 | Handfield et al. | |
| 2006/0237381 | A1 | 10/2006 | Lockwood et al. | |
| 2006/0266762 | A1 | 11/2006 | Andrews et al. | |
| 2007/0029340 | A1 | 2/2007 | Nagelski et al. | |
| 2007/0078561 | A1 | 4/2007 | Sansone | |
| 2007/0080175 | A1 | 4/2007 | Peterson | |
| 2007/0119796 | A1 | 5/2007 | Barkdoll | |
| 2007/0199863 | A1 | 8/2007 | Knoettgen-Nap | |
| 2007/0221679 | A1 | 9/2007 | Chandler et al. | |
| 2007/0251900 | A1 | 11/2007 | Hardy | |
| 2007/0273513 | A1 | 11/2007 | White | |
| 2007/0278164 | A1 | 12/2007 | Lang et al. | |
| 2007/0283615 | A1 | 12/2007 | Vlastakis | |
| 2008/0092394 | A1 | 4/2008 | Freitag et al. | |
| 2008/0142538 | A1 | 6/2008 | Miller | |
| 2008/0246375 | A1 | 10/2008 | Berq | |
| 2008/0283477 | A1 | 11/2008 | Wamsley et al. | |
| 2009/0084745 | A1 | 4/2009 | Goehring | |
| 2009/0166304 | A1 | 7/2009 | Hardy et al. | |
| 2009/0184069 | A1 | 7/2009 | Hardy | |
| 2009/0184129 | A1 | 7/2009 | Vlastakis et al. | |
| 2009/0184130 | A1 | 7/2009 | Miller et al. | |
| 2009/0242582 | A1 | 10/2009 | Vlastakis et al. | |
| 2009/0321373 | A1 | 12/2009 | Hardy | |
| 2010/0017025 | A1 | 1/2010 | Lockwood | |
| 2010/0079240 | A1 | 4/2010 | Higham | |
| 2010/0147783 | A1 | 6/2010 | Hardy | |
| 2010/0188221 | A1 | 7/2010 | Irmscher et al. | |
| 2010/0237093 | A1 | 9/2010 | Lockwood | |
| 2011/0017763 | A1 | 1/2011 | Colelli et al. | |
| 2011/0042331 | A1 | 2/2011 | Johnson et al. | |
| 2011/0042332 | A1 | 2/2011 | Hardy | |
| 2011/0094975 | A1 | 4/2011 | Hardy | |
| 2011/0210084 | A1 | 9/2011 | Hardy | |
| 2011/0220597 | A1 | 9/2011 | Sherretts et al. | |
| 2011/0240569 | A1 | 10/2011 | Kahl et al. | |
| 2011/0284488 | A1 | 11/2011 | Hardy | |
| 2011/0315706 | A1 | 12/2011 | Lockwood | |
| 2012/0000869 | A1 | 1/2012 | Hardy | |
| 2012/0285979 | A1 * | 11/2012 | Lockwood | 221/7 |
| 2013/0106259 | A1 | 5/2013 | Lockwood | |

FOREIGN PATENT DOCUMENTS

| | | |
|---|---|---|
| DE | 202007011927 | 12/2007 |
| EP | 1541064 | 6/2005 |
| EP | 1579789 | 9/2005 |
| JP | 1144185 | 6/1989 |
| JP | 2219194 | 8/1990 |
| JP | 9319937 | 12/1997 |
| JP | 2005049965 | 1/2005 |
| JP | 2006285930 | 10/2006 |
| WO | 8912873 | 12/1989 |
| WO | 2004028311 | 4/2004 |
| WO | 2007054042 | 5/2007 |
| WO | 2006085211 | 8/2007 |
| WO | 2010094778 | 8/2010 |
| WO | 2010141552 | 12/2010 |
| WO | 2010141552 A2 | 12/2010 |

OTHER PUBLICATIONS

International Search Report and Written Opinion mailed Nov. 26, 2010 in Application No. PCT/US2010/037026.

International Preliminary Report on Patentability dated Dec. 15, 2011 in Application No. PCT/US2010/037026.

* cited by examiner

PRODUCT DISPENSING SYSTEM

RELATED APPLICATION DATA

The present application is a non-provisional application of U.S. Provisional Application Ser. No. 61/346,211 filed on May 19, 2010 and titled "SECURE MERCHANDISING DISPLAYS WITH BLOCKER MECHANISMS," and is a continuation-in-part of U.S. Ser. No. 12/792,252, filed on Jun. 2, 2010, entitled "TIME DELAY PRODUCT PUSHING SYSTEM," the contents of both of which are hereby incorporated by this reference.

RELATED FIELDS

Embodiments generally relate to systems for advancing and controlling access to product on a shelf.

BACKGROUND

Theft of small items in retail stores is a common problem. Items that are in high demand by thieves include over-the-counter (OTC) products such as analgesics and cough and cold medications, razor blades, camera film, batteries, videos, DVDs, smoking cessation products and infant formula. Shelf sweeping is a particular problem for small items. Shelf sweeping occurs when individuals or groups remove all the shelf stock and exit the store, similar to a "smash and grab" shoplifting technique. Shelf sweeping relies on excessive quantities of product being available on the shelf. Retailers must keep substantial inventory on shelf or incur the cost, including labor costs, of constantly restocking.

In addition to preventing theft, retail stores may want to limit the purchase of certain items. For example, to make methamphetamine, large quantities of cold medication are needed. Pseudoephedrine, the sole active ingredient in many cold medicines and decongestants, is also a key ingredient in methamphetamine, a powerful and highly addictive stimulant.

Retailers are challenged to balance the needs of legitimate consumers' access to high theft items with measures to minimize the incidence of theft. Because theft has become so rampant in certain product categories, such as razors and infant formula, many retail stores are taking the products off the shelves and placing them behind the counter or under lock and key. Customers must request the products to make a purchase. This requires additional labor costs to provide individual service to customers who would normally not require it. It also makes it difficult for customers to compare products. Furthermore, it might not be feasible where the space behind the counter is limited and is needed for prescription medications. In some cases, products are simply unavailable due to high pilferage rates. Therefore, a device or dispensing apparatus that minimizes the incidence of product theft is needed.

SUMMARY

Dispensing systems and methods for controlled advancement of product on a shelf unit are provided. In some embodiments, the dispensing system includes a pusher, a track, and a brake. When engaged, the brake prevents the pusher from advancing product forward. In some embodiments, the dispensing system includes a dispensing ram having a resistance mechanism that provides a time delay in between the dispensing of products. Also provided in some embodiments are blocker mechanisms for blocking access to product located on the track and an access mechanism for restricting access to the dispensing system.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different figures is intended to illustrate like or analogous components.

DETAILED DESCRIPTION

Figure 3:
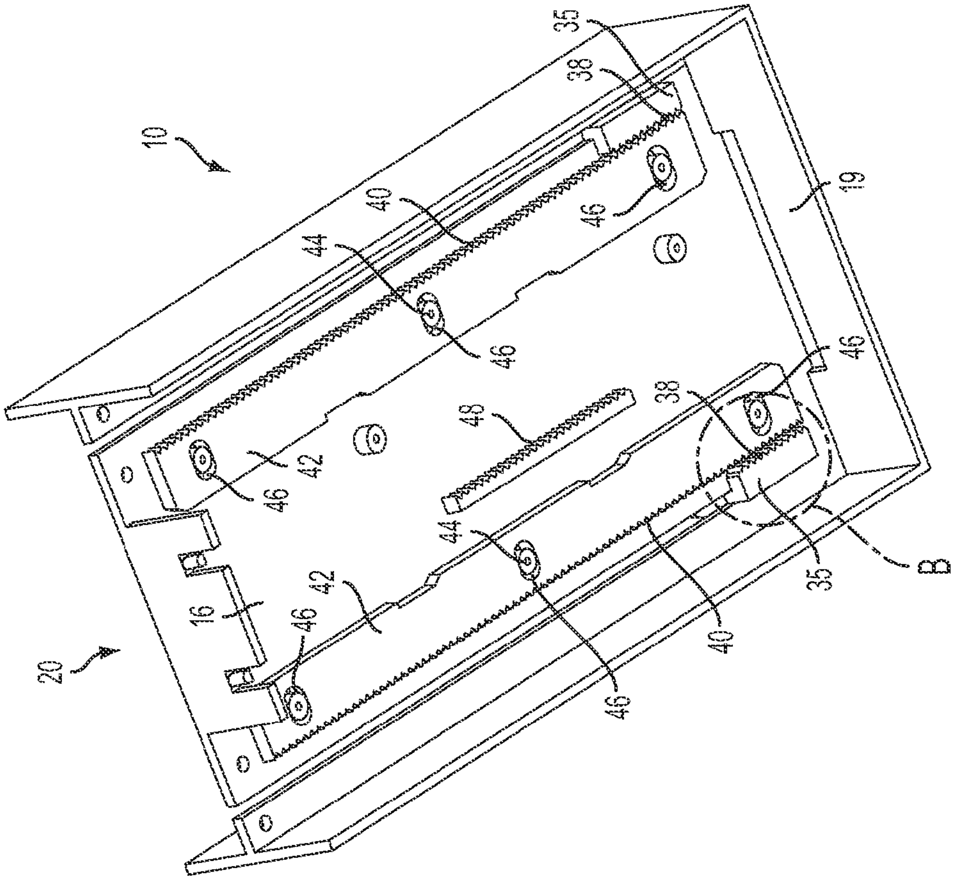
FIG. 3 is a bottom perspective view of the pushing device of FIG. 1.
Figure 6:
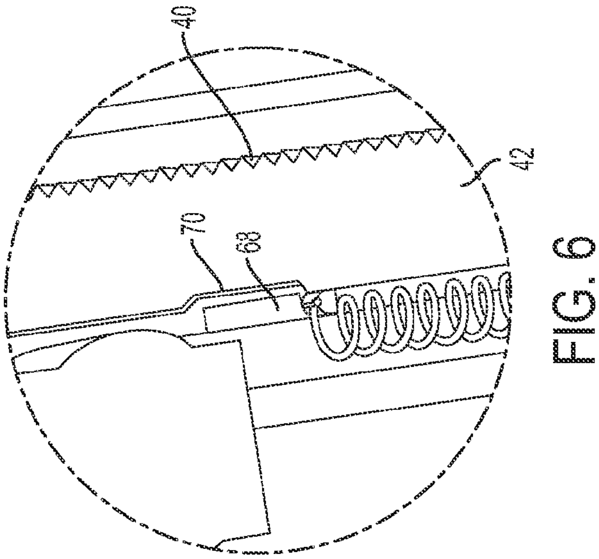
FIG. 6 is a partial view of the dispensing system of FIG. 5 taken at inset circle C.

Certain embodiments comprise a product dispensing system 100 that includes a product pushing device 10 (shown for example in FIGS. 1 and 3) for advancing product forward. As described more fully below, product pushing device 10 includes a track 16 and a pusher 12 and may also comprise a brake 42 (FIG. 3). It is sometimes desirable to position product close to the edge of a shelf unit and therefore, as a first product is removed from the shelf unit, the pusher 12 moves the products located behind the one that was removed forward. The product dispensing system 100 also may include a dispensing ram 54 (FIG. 18) and an access mechanism, such as drawer 106 (FIG. 22), which is coupled to the dispensing ram 54. The dispensing ram provides a time delay feature between the dispensing of products and also activates the brake 42 (FIG. 17) so that, in embodiments where a brake 42 is utilized, the brake 42 prevents forward movement of the pusher 12 when the access mechanism is in the open position. When the access mechanism is open, a blocking mechanism, such as blocker 104 (FIG. 21), may be engaged to block access to product located behind the access door. Each of the individual components of the product dispensing system 100 is first described below, and then the interaction of these individual components is described.

Figure 1:
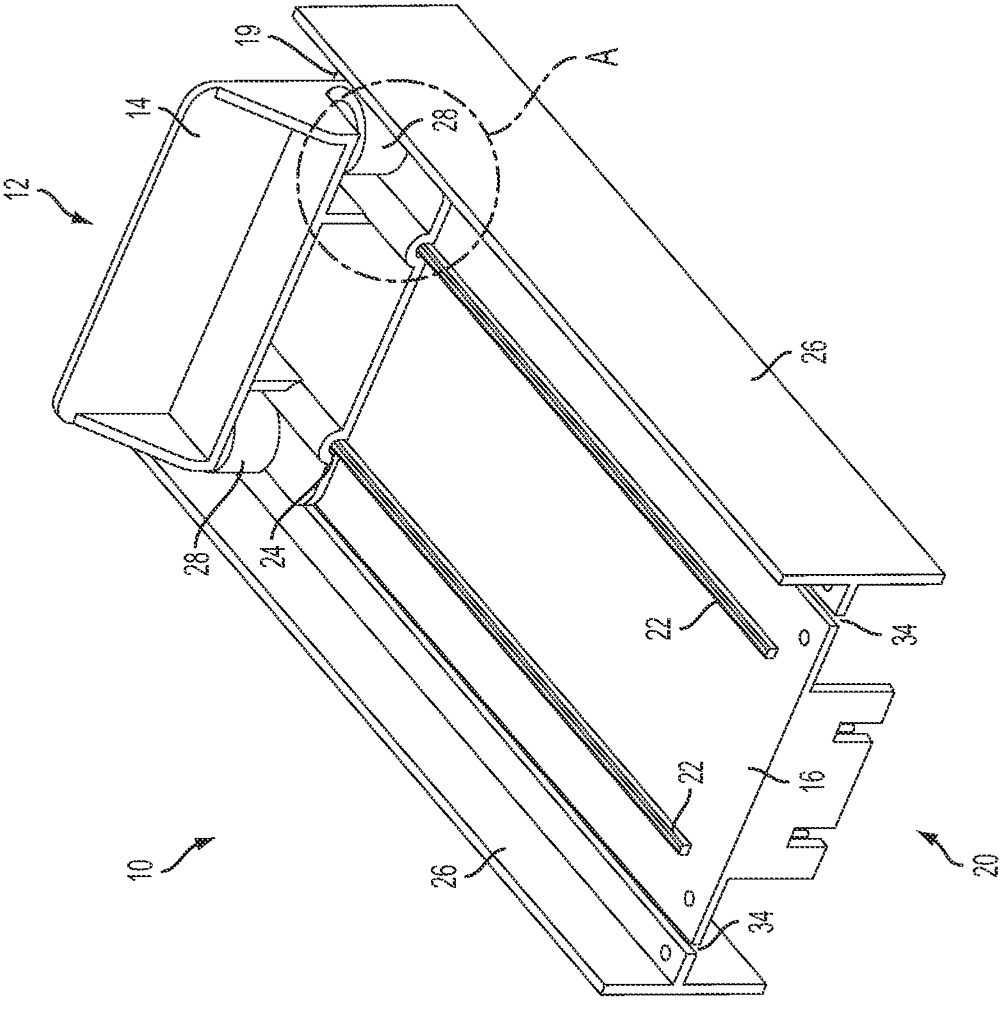
FIG. 1 is a top rear perspective view of a product pushing device according to one embodiment.
Figure 15:
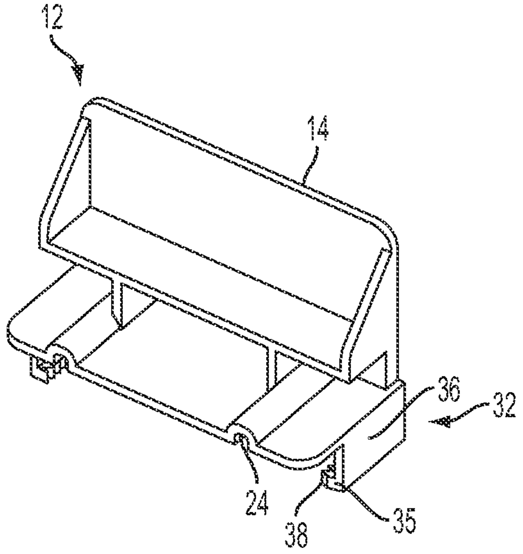
FIG. 15 is a perspective view of the pusher of FIG. 1.
Figure 16:
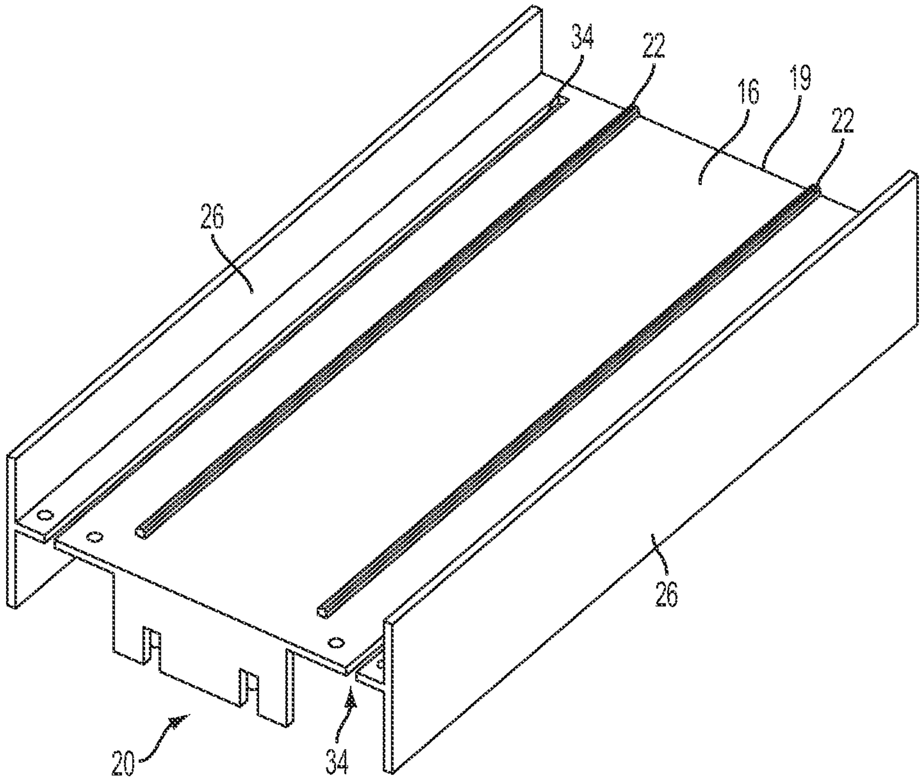
FIG. 16 is a top perspective view of the track of FIG. 1.

According to one embodiment, product pushing device 10, shown in FIGS. 1 and 3, comprises a pusher 12 that is slidably engaged with a track 16. As shown in FIG. 15, pusher 12 includes a pushing ram 14 that engages product (such as product 202, 204 shown in FIG. 13) and pushes the product toward the front 19 of the track 16. In the embodiment shown, the pushing ram 14 is a rectangular plate, although other suitable shapes and geometries may also be used. In some embodiments, one or more springs 28 are coupled to pusher 12 in any suitable manner, as shown in FIG. 1.

In the embodiment shown in FIG. 1, one end of each of the one or more springs 28 attaches to a sidewall 26 of the track 16, while the remainder of each of the springs 28 wraps around a post of pusher 12. In the embodiment shown in FIG. 1, an end of spring 28 includes an aperture (not illustrated), through which any suitable fastener, such as a screw, may pass to attach one end of the spring 28 to the sidewall 26 of track 16. Springs 28 may also be attached to pushing device 10 in any other suitable manner. Since an end of each of the springs 28 is in a fixed position relative to track 16, movement of the pusher 12 toward the rear 20 of the track lengthens the springs 28. When the springs are released, springs 28 urge pusher 12 in a forward direction toward the front 19 of the track 16. The one or more springs may be constant or variable force springs, such as those sold under the trademark Conforce®, or any other suitable type or brand of spring.

Figure 2:
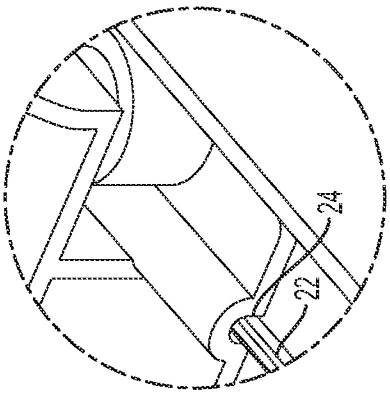
FIG. 2 is a partial view of the pushing device of FIG. 1 taken at inset circle A.

As shown in FIGS. 1, 2, and 15, pusher 12 includes one or more grooves 24 that slidably engage with one or more tongues 22 located on track 16. In other embodiments, the one or more grooves may be located on the track and the one or more tongues may be located on the pusher. Other suitable attachment mechanisms may be used in other embodiments to help maintain the sliding engagement of pusher 12 with track 16.

Product can be loaded on track 16 by forcing pushing ram 14 backwards along track 16 toward the rear 20 of track 16 and placing multiple units of the product against the pushing ram 14. As described above, springs 28 cause the pushing ram 14 to exert force on the products towards the front 19 of track 16. Springs 28 may be positioned anywhere along track 16 in relation to pusher 12, so that springs 28 are capable of either "pushing" or "pulling" pusher 12 forward.

Figure 4:
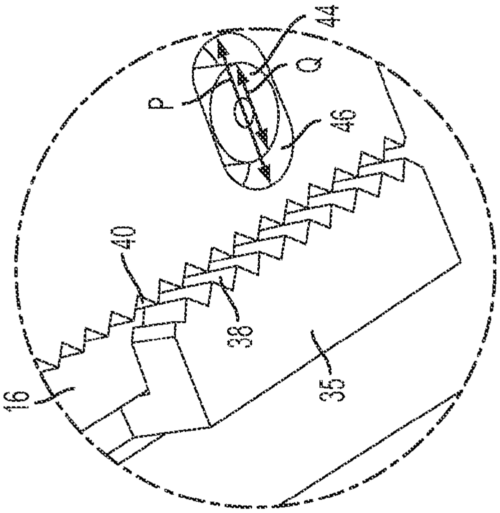
FIG. 4 is a partial view of the pushing device of FIG. 3 taken at inset circle B.

As shown in FIG. 15, pusher 12 includes one or more extensions 32 that include a neck portion 36 and a base portion 35. Neck portion 36 is configured to correspond to channels 34 of track 16 (FIG. 1) so that the neck portion is received within channels 34 and pusher 12 is in sliding engagement with track 16. The base portion 35 abuts the underside of the track 16 as shown in FIGS. 3-4 and includes a plurality of serrated teeth 38. Serrated teeth 38 may be positioned in various other manners along pusher 12.

In some embodiments, one or more brakes 42 are attached to the underside of track 16, as shown in FIG. 3. Each of the brakes 42 includes a plurality of serrated teeth 40, which are shaped to correspond to serrated teeth 38 on the base portion 35 of the extension 32 of pusher 12. In the embodiment shown in FIGS. 3, 4, and 17, serrated teeth 40 are located on the edge of brake 42, but could be located in any suitable location on brake 42. When the serrated teeth 38 of pusher 12 are engaged with the serrated teeth 40 of the track 16, movement of pusher 12 along track 16 is restricted, and in some embodiments, prevented. In this way, serrated teeth 40 of brake 42 serve as a brake that limits movement of pusher 12 along track 16.

Figure 17:
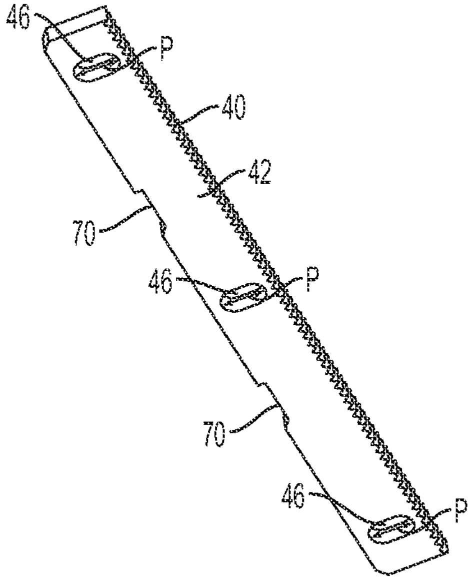
FIG. 17 is a perspective view of the brake of FIG. 2.

As shown in FIGS. 3 and 17, brakes 42 include one or more openings 46. Brakes 42 are attached to the underside of track 16 by inserting a fastener 44, such as a screw, rivet, or other suitable fastener, through the one or more openings 46. Openings 46 have a dimension P that is greater than a dimension Q of the fastener 44 (see FIG. 4) so that the brake 42 is able to move along dimension P. Movement of brake 42 to the outer portion of the P dimension causes the serrated teeth 40 of the brake 42 to engage with the serrated teeth 38 of the base portion 35 of the extension.

Figure 8:
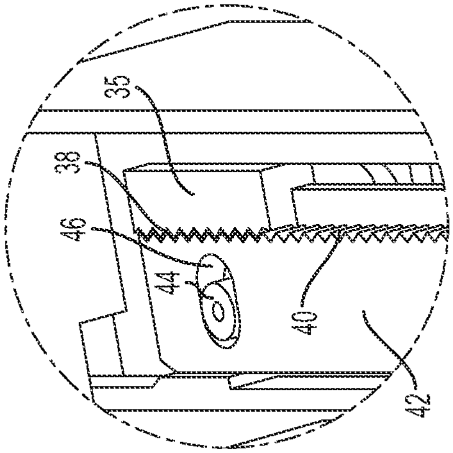
FIG. 8 is a partial view of the pushing device of FIG. 7 taken at inset circle D.

In this way, brakes 42 have a first orientation and a second orientation. In the first orientation, the brakes 42 are oriented relative to the track 16 so that the serrated teeth 40 of brake 42 do not contact the serrated teeth 38 of base portion 35 of the extension 32 of the pusher 12. When in the second orientation, the brakes 42 move laterally within opening 46 to the outer portion of the P dimension so that the serrated teeth 40 of the brake engage the serrated teeth 38 of the extension 32 of the pusher 12 and thus prevent movement of the pusher along the track 16. FIG. 4 illustrates the brake 42 in its first orientation while FIG. 8 illustrates the brake 42 in its second orientation.

Figure 5:
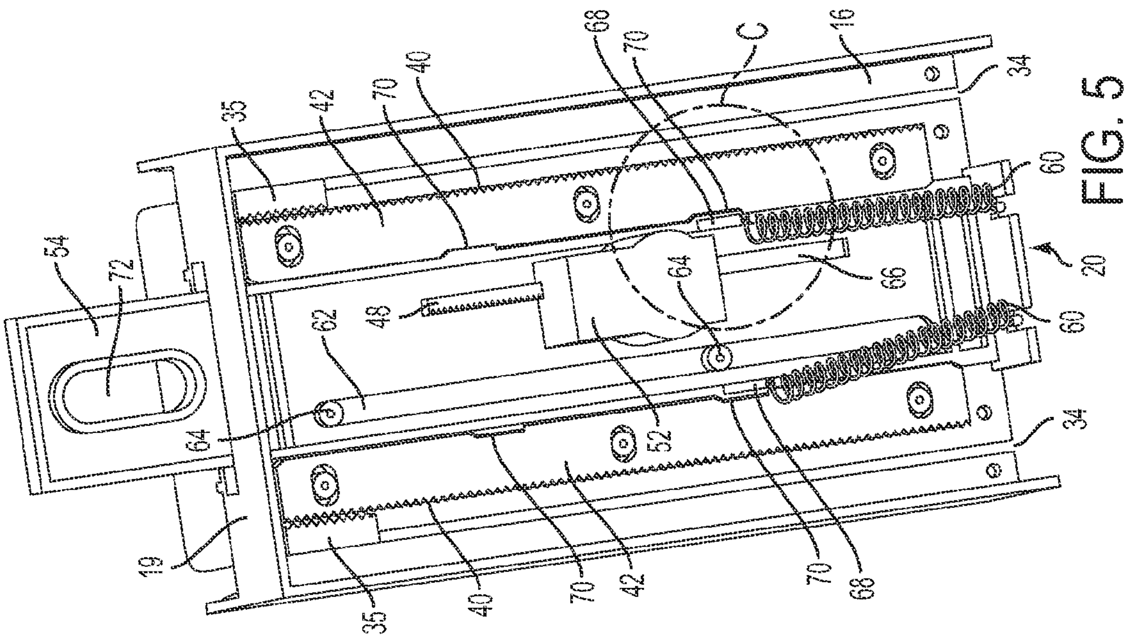
FIG. 5 is a bottom perspective view of the pushing device of FIG. 1, shown assembled with a dispensing ram according to one embodiment and shown with the dispensing ram in its original position.

Product dispensing system 100 also includes a dispensing ram 54 that may be attached in any suitable manner to track 16. As shown in FIG. 5, in some embodiments, dispensing ram 54 is attached to the underside of track 16, although dispensing ram 54 may be attached in any suitable location and in any suitable manner along track 16. In the embodiment shown in FIGS. 5 and 18, dispensing ram 54 includes a channel 62 that allows dispensing ram 54 to be slidably engaged with track 16. For example, fasteners 64, such as screws, rivets, or any other suitable fastener that allows movement of dispensing ram 54 in a front-to-rear direction along track 16, may be used to secure dispensing ram 54 to the underside of track 16. In some embodiments, fastener 64 may have a pronounced head or a head with a flange that engages channel 62 of dispensing ram 54 and permits movement of the dispensing ram 54 by way of channel 62 along track 16. There are many different ways in which the movement of dispensing ram 54 along track 16 can be achieved. As only one example, instead of a mechanical fastener, the dispensing ram 54 could be part of a molded feature that is contained within the system and moves with respect to the corresponding part of the system.

Figure 18:
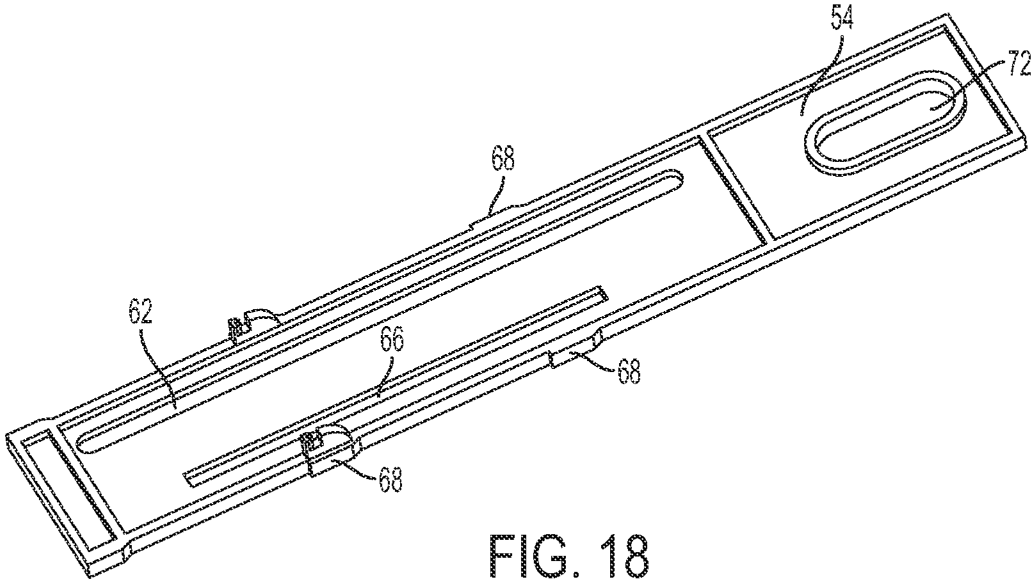
FIG. 18 is a perspective view of the dispensing ram of FIG. 5.
Figure 19:
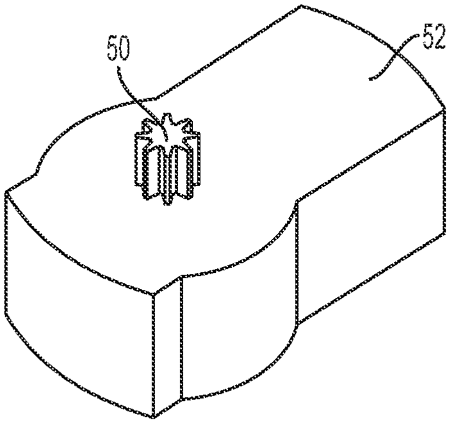
FIG. 19 is a perspective view of the resistance mechanism of FIG. 5.

Dispensing ram 54 also includes a resistance mechanism 52 (shown in FIG. 19) having an external gear component 50 that engages gear teeth 48 of the underside of track 16 (shown in FIG. 5) to slow the movement of dispensing ram 54 toward the rear 20 of track 16. In some embodiments, dispensing ram 54 includes a resistance channel 66, as illustrated in FIGS. 5 and 18. In these embodiments, resistance mechanism 52 is positioned on dispensing ram 54 so the external gear component 50 extends through the resistance channel 66. In such embodiments, dispensing ram 54 is positioned with respect to the underside of track 16 so that the resistance channel 66 aligns with the gear teeth 48 of the track 16 and so that external gear component 50 engages gear teeth 48 as dispensing ram 54 moves with respect to track 16 (FIG. 5). According to certain embodiments, one such resistance mechanism is a resistance motor, such as the resistance motor Model #w217 sold by Vigor, although other types of motors may also be used. In other embodiments, resistance mechanism is a rotary damper.

Figure 7:
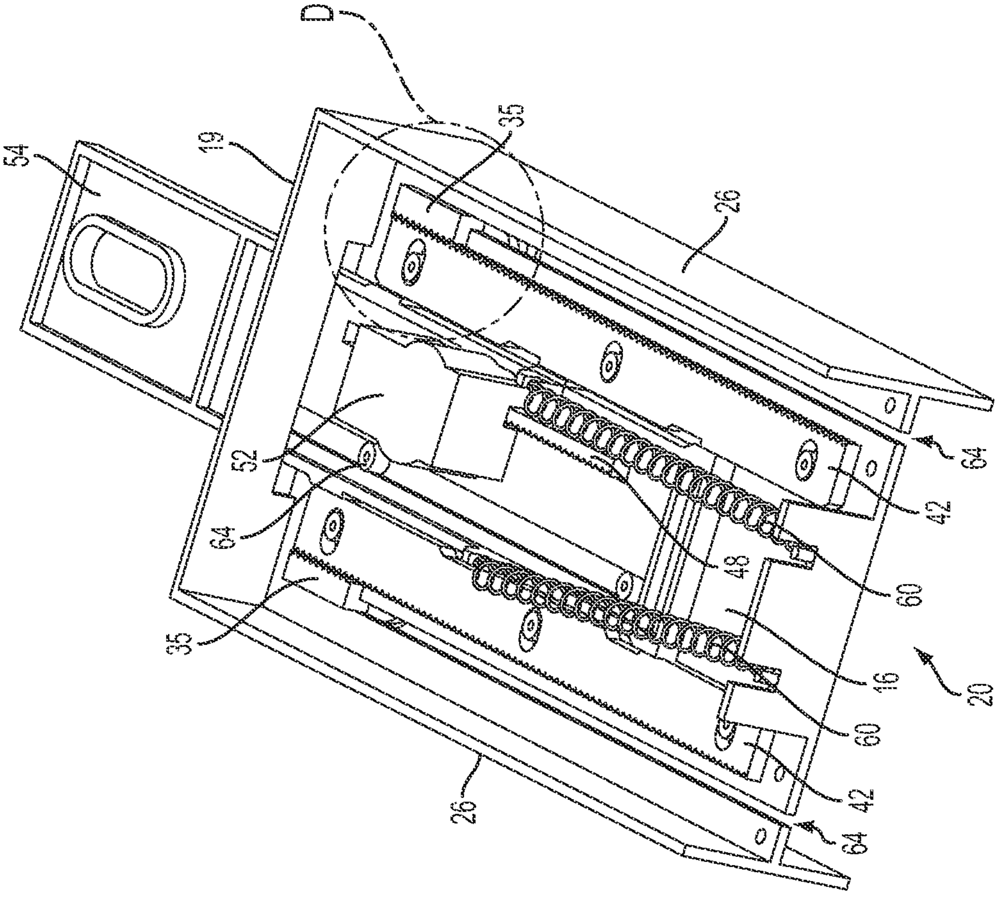
FIG. 7 is a bottom perspective view of the pushing device of FIG. 5, shown with the dispensing ram in its forward position.

In addition, dispensing ram 54 includes one or more male features, such as but not limited to protrusions 68, that are shaped to correspond to one or more female features, such as but not limited to cavities 70, located on the brakes 42 (see FIGS. 5, 17-18). As the dispensing ram 54 moves toward the front 19 of track 16 (see FIG. 7), protrusions 68 of the dispensing ram 54 interact with the cavities 70 of the brake 42 and cause the brake 42 to move in a lateral direction across openings 46 from the brake's first orientation to its second orientation. In alternate embodiments, the male feature, such as the protrusion, is located on the brake and the female feature, such as the cavity, is located on the dispensing ram. As described above and as illustrated in FIGS. 7-8, when the brake 42 is in the second orientation, the serrated teeth 40 of the brake 42 engage the serrated teeth 38 of the pusher 12 and stop movement of the pusher. Other suitable mechanisms could be used to move the brake from its first orientation to its second orientation. As only one example, instead of a mechanical device such as the ones described above, an electro-mechanical feature, such as a solenoid, could be used to move the brake between its first and second orientations.

The dispensing system 100 also includes one or more springs 60, one end of which is attached in any suitable fashion to the dispensing ram 54 and the other end of which is attached in any suitable fashion to the track 16. The springs 60 are positioned so that they urge the dispensing ram 54 to return to its original position (toward the rear 20 of the track 16 as shown in FIG. 5) after the dispensing ram has been extended to its forward position (FIG. 7) and is then released. Return of the dispensing ram 54 back to its original position ceases the interaction of the protrusions 68 of the dispensing ram 54 and the cavities 70 of the brakes 42 and thereby moves the brakes 42 from their second orientation to their first orientation so that the serrated teeth 40 of the brake disengage from the serrated teeth 38 of the base portion 35 of the extension 32 of the pusher 12. Once the serrated teeth 38 of the pusher 12 and the serrated teeth 40 of the brake 42 are disengaged, the pusher 12 is free to move without obstruction. Springs 60 may be positioned anywhere along track 16 in relation to dispensing ram 54, so that springs 60 are capable of either "pushing" or "pulling" dispensing ram 54 toward the rear 20 of track 16.

As the dispensing ram 54 returns to its original position toward the rear 20 of the track 16 (FIG. 5), the external gear component 50 of the resistance mechanism 52 rotates along gear teeth 48 of track 16. The internal gears of the resistance mechanism 52 are configured to provide resistance to the rearward movement of the dispensing ram 54 by limiting the rotation of the external gear component 50. Because the external gear component 50 engages gear teeth 48 of track 16 and the external gear rotation is limited, the rearward movement of dispensing ram 54 back to its original position is slowed.

Figure 9:
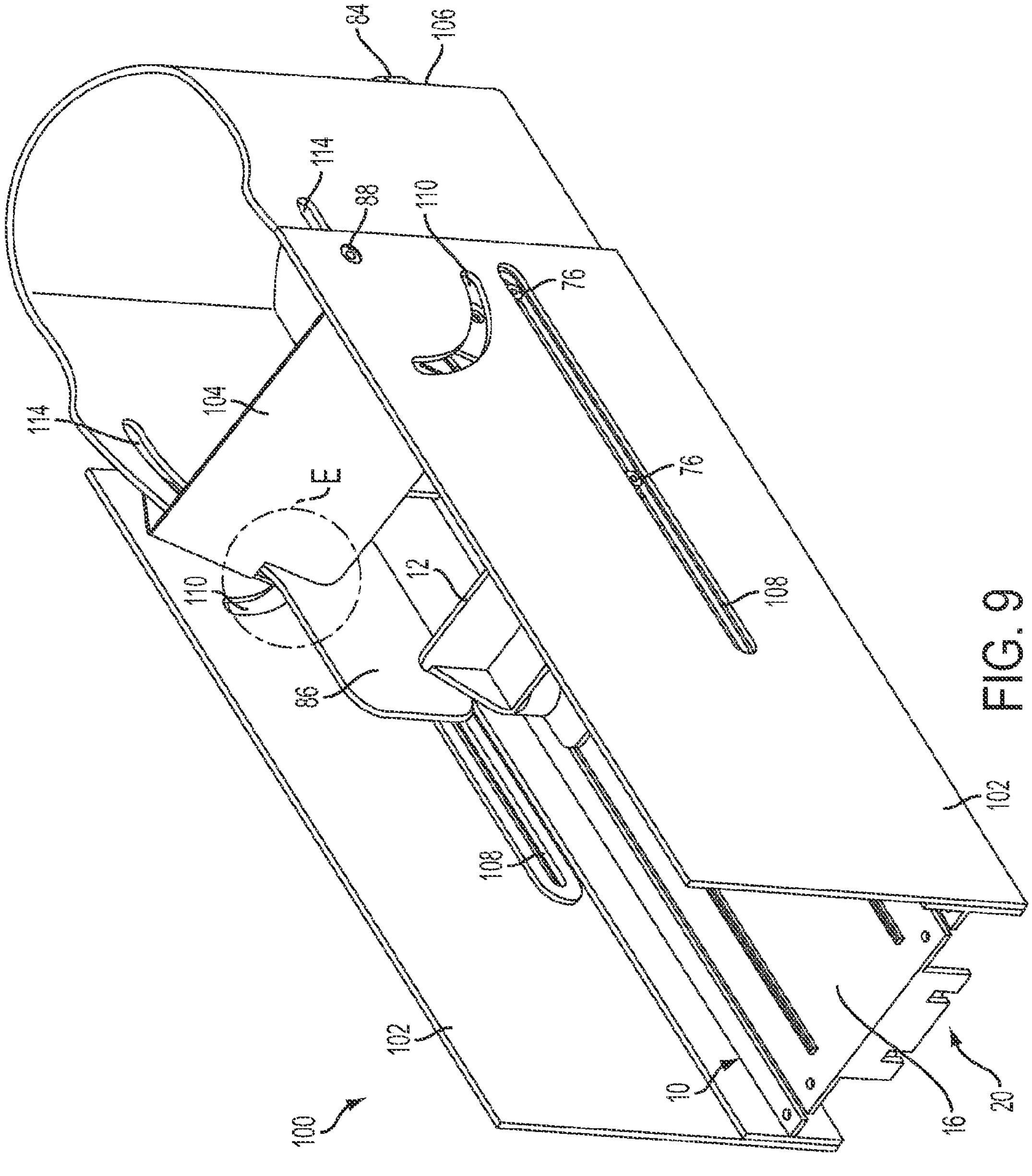
FIG. 9 is a top rear perspective view of a product dispensing system according to one embodiment.
Figure 11:
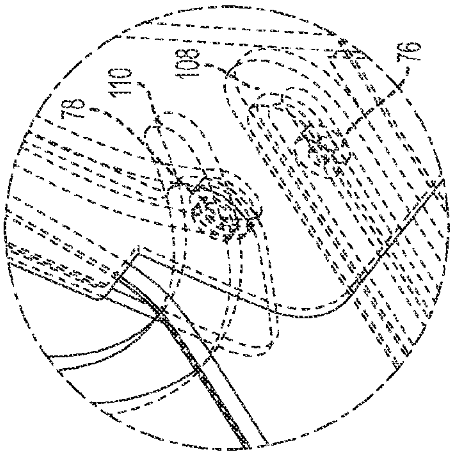
FIG. 11 is a partial view of the dispensing system of FIG. 9 taken at inset circle E.
Figure 13:
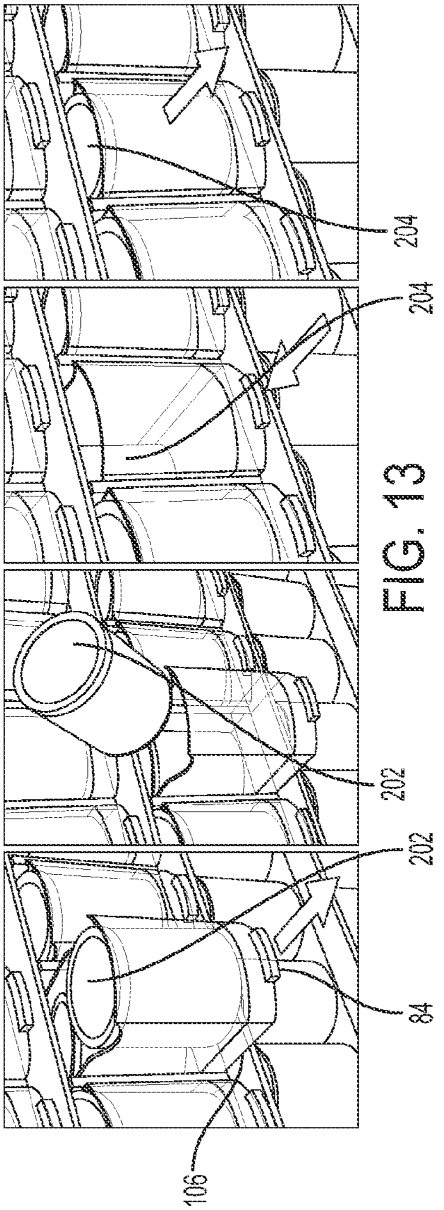
FIG. 13 illustrates the vending of a product from a dispensing system, such as the dispensing system shown in FIGS. 9-10, according to one embodiment.

FIG. 9 is a rear perspective view of assembled product dispensing system 100. As shown in FIG. 9, product dispensing system 100 includes an access mechanism that provides consumer access to product housed within track 16. In some embodiments, access mechanism is a dispensing drawer 106 that is positioned with respect to product pushing device 10 and that is coupled to the dispensing ram 54, which is described in more detail below. Dispensing drawer 106 may include a handle 84 in some embodiments to assist with vending, as shown in FIG. 13. In some embodiments, the drawer 106 is made of a translucent material so that the products stored within the display case are visible. In other embodiments, access mechanism is a tip bin door assembly, a shuttle style door, or any other suitable structure that selectively allows access to product housed within the dispensing system 100.

Figure 12:
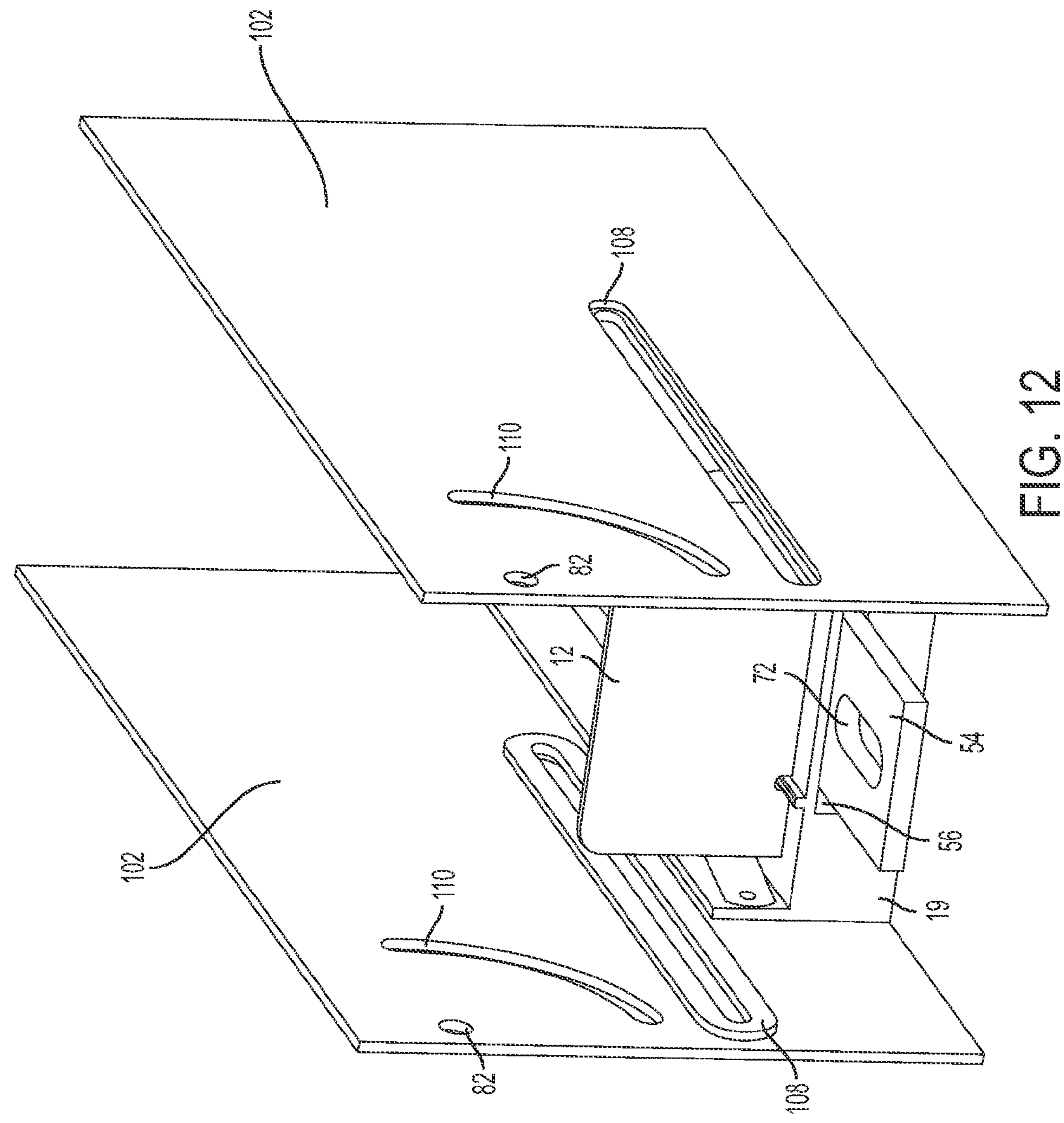
FIG. 12 is a front perspective view of the dispensing system of FIG. 9 as partially assembled.

In some embodiments, the front 19 of track 16 includes an opening 56 through which dispensing ram 54 protrudes (see FIG. 12). Dispensing ram 54 is coupled in any suitable fashion to drawer 106. As only one example of a suitable coupling mechanism, shown in FIG. 10, dispensing ram 54 includes an opening 72 that receives a projection 74 of drawer 106. Thus, as drawer 106 is pulled forward for vending of product housed in product dispensing system 100, illustrated in FIG. 13, the dispensing ram 54 is also pulled toward the front of track 16 to its forward position, as described above.

Figure 10:
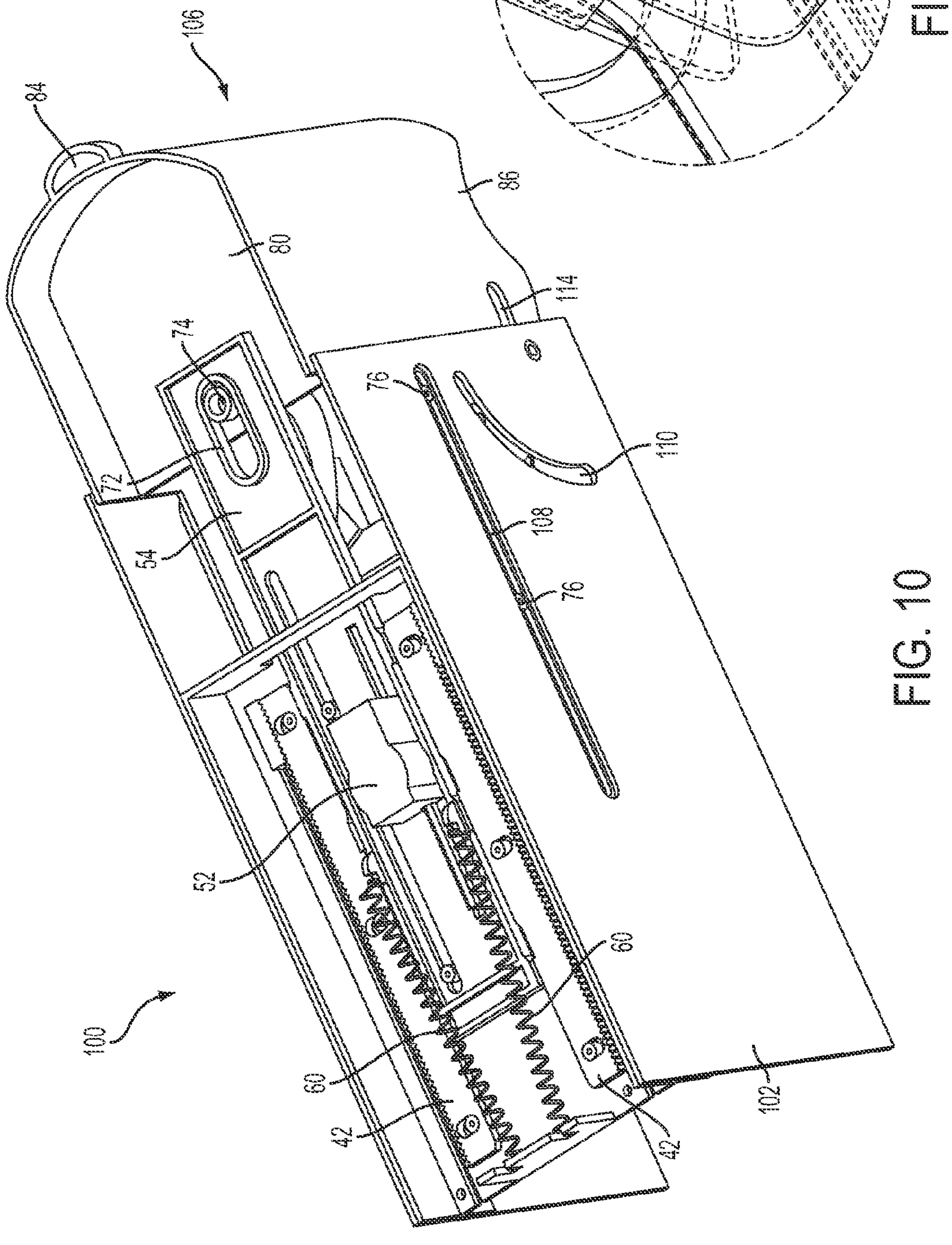
FIG. 10 is a bottom rear perspective view of the product dispensing system of FIG. 9.
Figure 22:
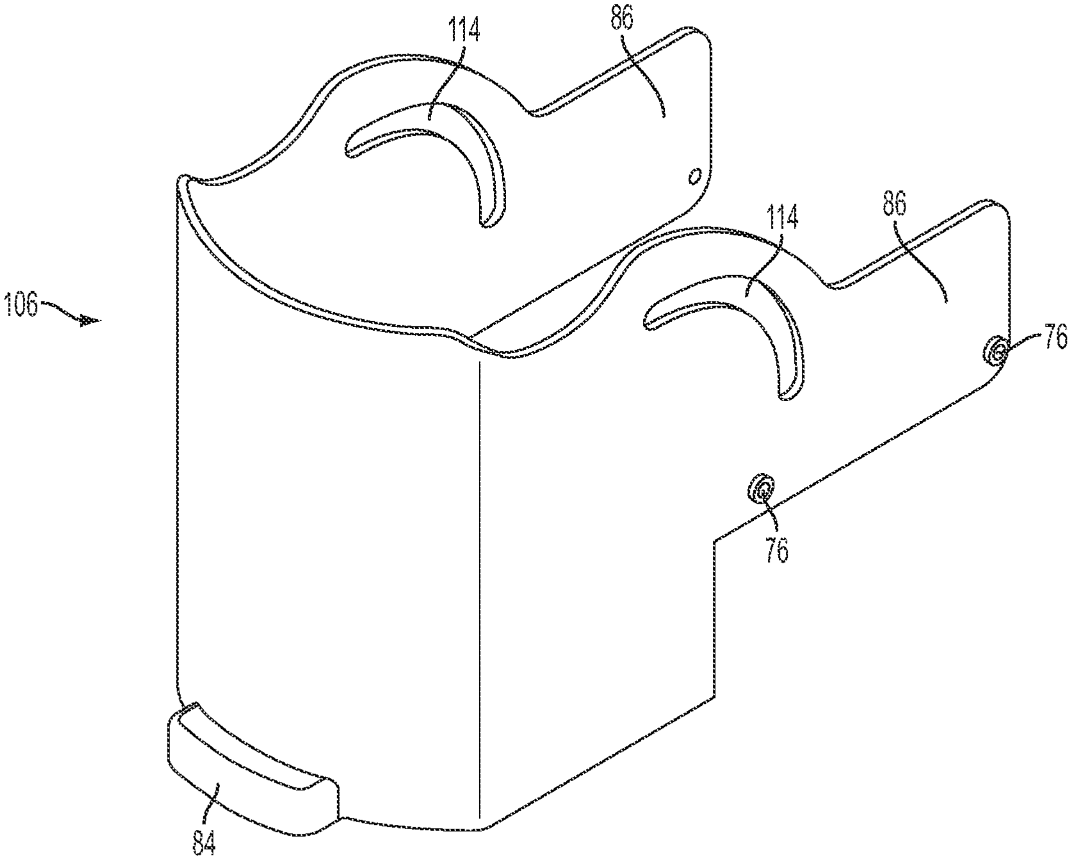
FIG. 22 is a perspective view of the drawer of FIG. 9.

As shown in FIG. 10, in some embodiments, drawer 106 includes sidewalls 86 and a floor 80 on which at least one product can rest. In some embodiments, floor 80 is dimensioned to accommodate only one product. As shown in FIG. 13, the forward most product 202 on track 16 is pushed by pusher 12 from track 16 onto floor 80 of drawer 106 in some embodiments. Once that product 202 has been vended, the next product 204 is pushed by pusher 12 onto the floor 80 of drawer 106. As shown in FIG. 22, each of the sidewalls 86 of drawer 106 includes at least one projection 76, which can be a fastener or any suitable projection.

Figure 20:
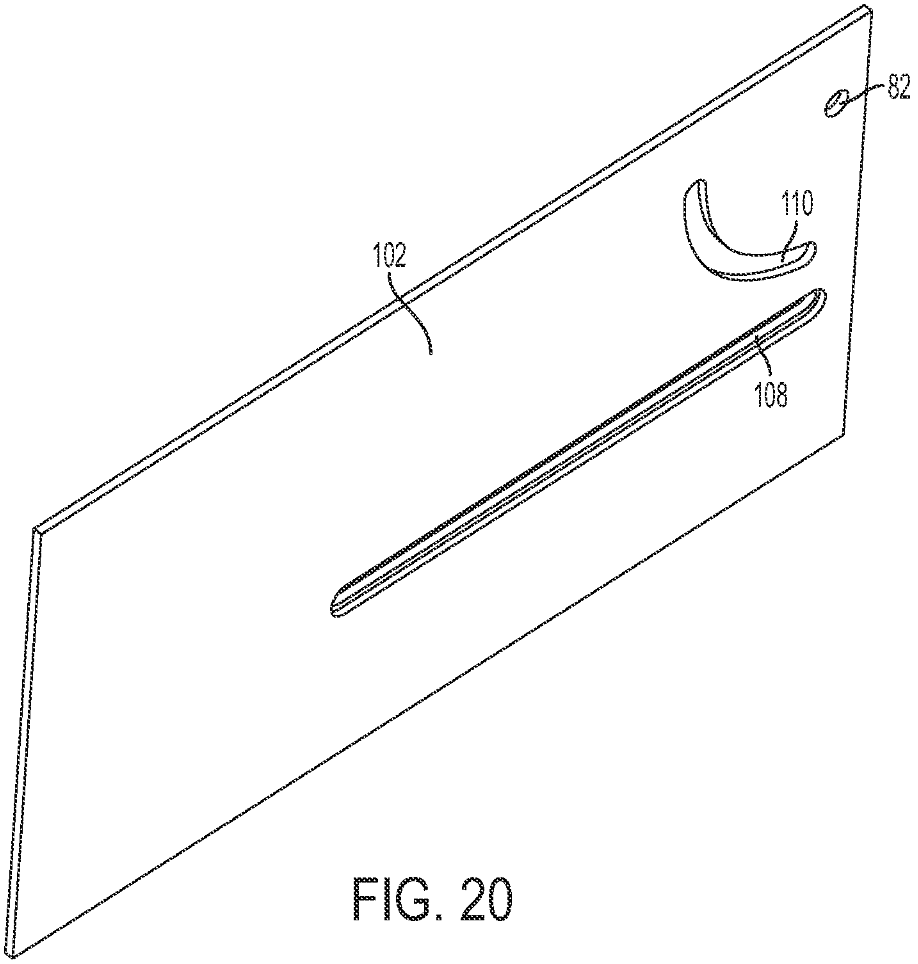
FIG. 20 is a perspective view of the sidewall of the dispensing system of FIG. 9.

When fully assembled, product dispensing system 100 includes sidewalls 102 that are positioned outside of sidewalls 86 of drawer 106, as shown in FIGS. 9-10. Sidewall 102 is also shown in FIG. 20. The product pushing device 10 is situated between the sidewalls 102. Sidewalls 102 include slots 108 along which the projections 76 of the drawer 106 translate as the drawer 106 moves relative to the track 16. In this way, drawer 106 can be displaced in a forward-backward direction relative to the product dispensing system 100. The sidewalls 86 of drawer 106 also include slots 114 (FIG. 22) that align with slots 110 of sidewalls 102, described below.

Figure 21:
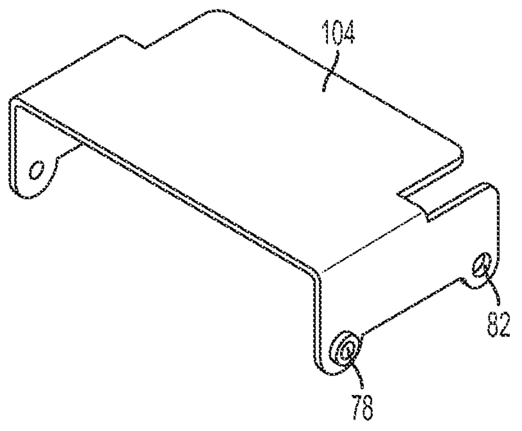
FIG. 21 is a perspective view of the blocker shown in FIG. 9.

Product dispensing system 100 also includes a blocker mechanism, such as blocker 104, illustrated in FIGS. 9 and 21. In certain embodiments, blocker 104 is coupled to drawer 106 and the sidewalls 102 of product dispensing system at attachment points 82 using fasteners 88, although blocker 104 can be attached to dispensing system 100 in any suitable manner. As shown in FIGS. 20-21, blocker 104 includes projections 78 that are shaped and sized to be received within and traverse along slots 110 in the sidewalls 102. As drawer 106 is pulled forward from the closed position into the vending position, the projections 78 traverse downward along slots 110 of sidewalls 102 and also along slots 114 of the sidewalls 86 of the drawer 106, which causes blocker 104 to rotate around attachment point 82 and move from a first position to a second position. Specifically, blocker 104 moves from a substantially horizontal position to an angled position, so that blocker 104 blocks access to product stored behind it. In some embodiments, blocker 104 is generally located above the front of track 16. When drawer 106 is in the closed position, the drawer 106 abuts the front 19 of track 16 (FIG. 12) and access to all product within the dispensing system is restricted. When drawer 106 is in the vending position, the drawer is displaced away from the front 19 of track 16 so that, while a consume has access to product located on floor 80 of drawer 106, access to product located within track 16 (and behind product stored on floor 80 of drawer 106) is blocked by blocker 104.

Also disclosed are methods of dispensing product using the product dispensing system 100 described above. In some embodiments, as shown in FIG. 13, when drawer 106 is pulled forward for vending of the product, such as product 202, located within drawer 106, blocker 104 rotates along attachment point 82 and prevents access to product located on track 16 behind blocker 104. Moreover, as drawer 106 is pulled forward into the vending position, projection 74 of drawer 106 engages with the opening 72 of the dispensing ram 54 and pulls the dispensing ram 54 in a forward direction relative to track 16 (FIG. 10). As explained above, when dispensing ram 54 moves toward the front 19 of track 16, the protrusions 68 of dispensing ram 54 engage the cavities 70 of the brakes 42 and thus displace the brakes 42 laterally so that the teeth 40 of brake 42 engage the teeth 38 of the pusher 12 and stop forward movement of the pusher. In this way, when the drawer 106 is pulled forward (from a closed position into a vending position) for product vending, the forward movement of the pusher is prevented so that product cannot be urged from the front of the track onto the floor 80 of the drawer 106.

As also described above, movement of drawer 106 into the vending position pulls the dispensing ram 54 forward and stretches springs 60. Once the drawer 106 is released (such as by a consumer), the compression of springs 60 pulls the dispensing ram 54 back to its original position toward the rear 20 of the track, as slowed by the resistance mechanism 52, and, since drawer 106 is coupled to dispensing ram 54, also pulls the drawer 106 from its vending position to its closed position. In this way, the resistance mechanism 52 provides a time delay feature so that a consumer must wait a predetermined amount of time for the dispensing ram (and the drawer) to return to its original position before the next product can be vended (FIG. 13). Such a time delay feature has been found to be a substantial deterrence to product theft.

The front 19 of track 16 serves to stop drawer 106 as it returns to its original position. As described above, movement of the dispensing ram 54 to its original position releases the protrusions of the dispensing ram from the cavities of the brake and therefore disengages the teeth 40 of the brake 42 from the teeth 38 of the pusher 12 and allows the pusher 12 to advance in a forward direction toward the front of the track 16 and to push the next product 204 off of track 16 and onto the floor 80 of the drawer 106 for vending (FIG. 13). The dispensing system 100 is then ready for vending of product 204.

Figure 14:
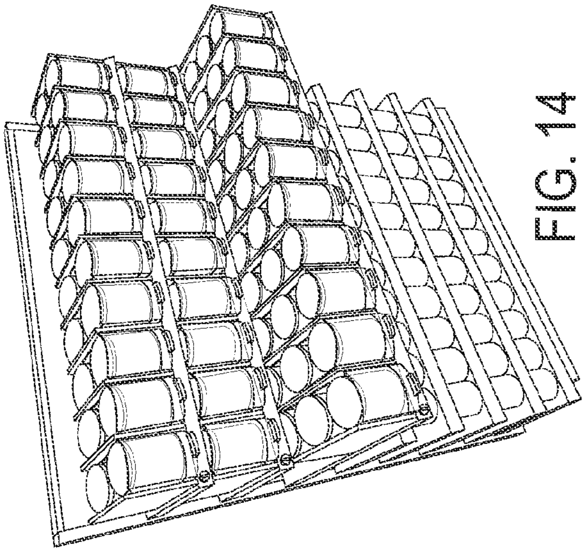
FIG. 14 is a front perspective view of a shelving unit that contains a plurality of dispensing assemblies according to one embodiment, with the shelving unit pulled out in drawer-like fashion.

As shown in FIGS. 13-14, multiple product dispensing systems 100 can be positioned adjacent one another between two retail shelving units. Alternatively, one or more product dispensing systems 100 may be positioned on a single shelving unit, or placed on any type of surface such as a countertop. As shown in FIG. 14, the shelves on which product dispensing system 100 are located can be sliding shelves. In these embodiments, the shelves may include locks that lock the shelf in place. When unlocked, the shelves are capable of sliding forward in a drawer-like fashion so that product can be easily re-stocked from above.

Various modifications could be made to the exemplary embodiments, as described above with reference to the corresponding illustrations, without departing from the scope of the invention, and therefore, it is intended that all matter contained in the foregoing description and shown in the accompanying drawings shall be interpreted as illustrative rather than limiting. Thus, the breadth and scope of the invention should not be limited by any of the above-described exemplary embodiments, but should be instead defined only in accordance with any claims which may be appended hereto and their equivalents.

The invention claimed is:

1. A dispensing system comprising a track, a pusher in sliding engagement with the track, at least one pusher spring that urges the pusher toward a front of the track, at least one brake, a dispensing ram, at least one dispensing ram spring, a resistance mechanism, an access mechanism coupled to the dispensing ram, and a blocker mechanism coupled to the access mechanism, wherein the dispensing system is capable of moving between a first configuration and a second configuration, wherein, when the dispensing system is in the first configuration:

(a) the at least one brake is in a first orientation that does not limit the forward movement of the pusher;

(b) the dispensing ram is in an original position toward a rear of the track and does not engage the at least one brake;

(c) the access mechanism is in a closed position that restricts access to product stored within the dispensing system, and (d) the blocker mechanism is in a first orientation that does not restrict access to the track, and wherein, when the dispensing system is in the second configuration:

(a) the at least one brake is in a second orientation and is engaged with the pusher to stop forward movement of the pusher;

(b) the dispensing ram is in a forward position toward a front of the track and engages the at least one brake to urge the at least one brake into its second orientation;

(c) the access mechanism is in a vending position that allows access to at least some of the product stored within the dispensing system; and (d) the blocker mechanism is in a second orientation that restricts access to the track, and wherein, as the system moves from the second configuration to the first configuration, the at least one dispensing ram spring urges the dispensing ram from its forward position to its original position and the resistance mechanism slows the speed at which the dispensing ram moves from its forward position to its original position.

2. The system of claim 1, wherein the at least one brake further comprises a plurality of teeth that engage with a plurality of teeth on a base portion of the pusher when the at least one brake is in the second orientation.

3. The system of claim 1, wherein the at least one brake further comprises at least one opening having a dimension that is greater than a dimension of a fastener that is receivable in the at least one opening to secure the at least one brake to the track.

4. The system of claim 3, wherein the at least one brake traverses along the dimension of the opening when the at least one brake moves from the first orientation to the second orientation.

5. The system of claim 1, wherein the dispensing ram comprises structure that interacts with structure on the at least one brake to cause the at least one brake to move from the first orientation to the second orientation as the dispensing ram moves from its original position to its forward position, and that causes the at least one brake to move from its second orientation to its first orientation as the dispensing ram moves from its forward position to its original position.

6. The system of claim 1, wherein the access mechanism is a drawer having a floor onto which the pusher urges at least one product from the track.

7. The system of claim 6, wherein the floor is configured to receive only one product at a time.

8. The system of claim 1, wherein the dispensing system further comprises sidewalls, each sidewall comprising at least one first slot, and wherein the access mechanism comprises projections that are receivable within the at least one first slots and that translate along the at least one first slots as the access mechanism moves from the closed position to the vending position.

9. The system of claim 8, wherein each of the sidewalls comprises at least one second slot, and wherein the blocker mechanism comprises projections that are receivable within the at least one second slots of the sidewalls and that translate along the at least one second slots as the blocker mechanism moves from the first orientation to the second orientation.

10. The system of claim 9, wherein the blocker mechanism rotates along an attachment point in the sidewalls as the blocker mechanism moves from the first orientation to the second orientation.

11. A dispensing system for controlled vending of a product comprising:

(a) a product pushing device comprising a track, a pusher that is slidably engaged with the track, and at least one pusher spring that urges the pusher toward a front of the track;

(b) at least one brake coupled to the track, the at least one brake having a first orientation and a second orientation, wherein, when in the second orientation, the at least one brake engages with the pusher to stop movement of the pusher;

(c) a dispensing ram coupled to the track, the dispensing ram having an original position and a forward position, wherein, when in moving from the original position to the forward position, the dispensing ram moves the at least one brake from its first orientation to its second orientation;

(d) an access mechanism coupled to the dispensing ram, the access mechanism having a closed position and a vending position, wherein, when in moving from the closed position to the vending position, the access mechanism moves the dispensing ram from its original position to its forward position; and (e) a blocker mechanism coupled to the access mechanism, the blocker mechanism having a first orientation and a second orientation, the second orientation blocking access to product stored on the track, wherein the blocker mechanism is in the first orientation when the access mechanism is in the closed position and wherein the blocker mechanism is in the second orientation when the access mechanism is in the vending position, wherein the at least one brake further comprises a plurality of teeth that engage with a plurality of teeth on a base portion of the pusher when the at least one brake is in the second orientation.

12. The system of claim 11, wherein the dispensing system further comprises sidewalls, each sidewall comprising at least one first slot, and wherein the access mechanism comprises projections that are receivable within the at least one first slots and that translate along the at least one first slots as the access mechanism moves from the closed position to the vending position.

13. The system of claim 12, wherein each of the sidewalls comprises at least one second slot, and wherein the blocker mechanism comprises projections that are receivable within the at least one second slots of the sidewalls and that translate along the at least one second slots as the blocker mechanism moves from the first orientation to the second orientation.

14. The system of claim 12, wherein the blocker mechanism rotates along an attachment point in the sidewalls as the blocker mechanism moves from the first orientation to the second orientation.

15. The system of claim 11, further comprising at least one dispensing ram spring that urges the dispensing ram from its forward position to its original position.

16. The system of claim 15, further comprising a resistance mechanism that slows the speed at which the dispensing ram moves from the forward position to the original position to provide a time delay in between vending of product.

17. The system of claim 11, wherein the access mechanism restricts access to the product located within the system when in the closed position.

18. The system of claim 11, wherein the access mechanism is a drawer having a floor onto which the pusher urges at least one product from the track.

19. The system of claim 18, wherein the floor is configured to receive only one product at a time.

20. A dispensing system for controlled vending of a product comprising:

(a) a product pushing device comprising a track, a pusher that is slidably engaged with the track, and at least one pusher spring that urges the pusher toward a front of the track;

(b) at least one brake coupled to the track, the at least one brake having a first orientation and a second orientation, wherein, when in the second orientation, the at least one brake engages with the pusher to stop movement of the pusher;

(c) a dispensing ram coupled to the track, the dispensing ram having an original position and a forward position, wherein, when in moving from the original position to the forward position, the dispensing ram moves the at least one brake from its first orientation to its second orientation;

(d) an access mechanism coupled to the dispensing ram, the access mechanism having a closed position and a vending position, wherein, when in moving from the closed position to the vending position, the access mechanism moves the dispensing ram from its original position to its forward position; and (e) a blocker mechanism coupled to the access mechanism, the blocker mechanism having a first orientation and a second orientation, the second orientation blocking access to product stored on the track, wherein the blocker mechanism is in the first orientation when the access mechanism is in the closed position and wherein the blocker mechanism is in the second orientation when the access mechanism is in the vending position, wherein the dispensing ram comprises structure that interacts with structure on the at least one brake to cause the at least one brake to move from the first orientation to the second orientation as the dispensing ram moves from its original position to its forward position, and that causes the at least one brake to move from its second orientation to its first orientation as the dispensing ram moves from its forward position to its original position.

21. A dispensing system for controlled vending of a product comprising:

(a) a product pushing device comprising a track, a pusher that is slidably engaged with the track, and at least one pusher spring that urges the pusher toward a front of the track;

(b) at least one brake coupled to the track, the at least one brake having a first orientation and a second orientation, wherein, when in the second orientation, the at least one brake engages with the pusher to stop movement of the pusher;

(c) a dispensing ram coupled to the track, the dispensing ram having an original position and a forward position, wherein, when in moving from the original position to the forward position, the dispensing ram moves the at least one brake from its first orientation to its second orientation;

(d) an access mechanism coupled to the dispensing ram, the access mechanism having a closed position and a vending position, wherein, when in moving from the closed position to the vending position, the access mechanism moves the dispensing ram from its original position to its forward position; and (e) a blocker mechanism coupled to the access mechanism, the blocker mechanism having a first orientation and a second orientation, the second orientation blocking access to product stored on the track, wherein the blocker mechanism is in the first orientation when the access mechanism is in the closed position and wherein the blocker mechanism is in the second orientation when the access mechanism is in the vending position, wherein the at least one brake further comprises at least one opening having a dimension that is greater than a dimension of a fastener that is receivable in the at least one opening to secure the at least one brake to the track.

22. The system of claim 21, wherein the at least one brake traverses along the dimension of the opening when the at least one brake moves from the first orientation to the second orientation.

23. A dispensing system for controlled vending of a product comprising:

(a) a product pushing device comprising a track, a pusher that is slidably engaged with the track, and at least one pusher spring that urges the pusher toward a front of the track;

(b) at least one brake coupled to the track, the at least one brake comprising at least one of a male or female feature and the at least one brake having a first orientation and a second orientation, wherein, when in the second orientation, the at least one brake engages the pusher to stop movement of the pusher;

(c) a dispensing ram coupled to the track and comprising at least one of the other of the male or female feature, the dispensing ram having an original position and a forward position and wherein, when, in the original position, the dispensing ram does not contact the at least one brake and wherein, in moving from the original position to the forward position, the at least one of the male or female feature of the dispensing ram interacts with the at least one of the other of the male or female feature of the at least one brake to move the at least one brake from its first orientation to its second orientation;

(d) an access mechanism coupled to the dispensing ram, the access mechanism having a closed position and a vending position, wherein, in moving from the closed position to the vending position, the access mechanism moves the dispensing ram from its original position to its forward position;

(e) a blocker mechanism coupled to the access mechanism, the blocker mechanism having a first orientation and a second orientation, the second orientation blocking access to product stored on the track, wherein the blocker mechanism is in the first orientation when the access mechanism is in the closed position and wherein the blocker mechanism is in the second orientation when the access mechanism is in the vending position;

(f) at least one dispensing ram spring that urges the dispensing ram from its forward position to its original position; and (g) a resistance mechanism that slows the speed at which the dispensing ram moves from its forward position to its original position.

* * * * *